(12) United States Patent
Ogawa et al.

(10) Patent No.: US 10,348,132 B2
(45) Date of Patent: Jul. 9, 2019

(54) WIRELESS POWER TRANSMISSION DEVICE, WIRELESS POWER TRANSMISSION METHOD, NON-TRANSITORY COMPUTER READABLE MEDIUM AND WIRELESS POWER TRANSMISSION SYSTEM

(71) Applicant: KABUSHIKI KAISHA TOSHIBA, Tokyo (JP)

(72) Inventors: Kenichirou Ogawa, Kanagawa (JP); Tetsu Shijo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 243 days.

(21) Appl. No.: 15/393,896

(22) Filed: Dec. 29, 2016

(65) Prior Publication Data

US 2017/0264142 A1    Sep. 14, 2017

(30) Foreign Application Priority Data

Mar. 14, 2016    (JP) .................................. 2016-049977

(51) Int. Cl.

| | |
|---|---|
| *H02J 50/12* | (2016.01) |
| *H02J 50/90* | (2016.01) |
| *H02J 7/02* | (2016.01) |
| *H02J 50/40* | (2016.01) |
| *H02J 50/60* | (2016.01) |

(52) U.S. Cl.
CPC .............. *H02J 50/12* (2016.02); *H02J 7/025* (2013.01); *H02J 50/40* (2016.02); *H02J 50/90* (2016.02); *H02J 50/60* (2016.02)

(58) Field of Classification Search
CPC ...................................................... H02J 50/12
USPC .......................................................... 307/104
See application file for complete search history.

(56) References Cited

U.S. PATENT DOCUMENTS

| | | | |
|---|---|---|---|
| 8,810,071 B2 | 8/2014 | Sauerlaender et al. | |
| 2014/0266031 A1 | 9/2014 | Sasaki | |
| 2015/0042169 A1* | 2/2015 | Park ...................... | B60L 11/182 |
| | | | 307/104 |
| 2015/0076921 A1* | 3/2015 | Park ........................ | H02J 50/12 |
| | | | 307/104 |
| 2016/0272071 A1 | 9/2016 | Taniguchi et al. | |

(Continued)

FOREIGN PATENT DOCUMENTS

| | | |
|---|---|---|
| JP | 2011-517265 A | 5/2011 |
| JP | 2011-169043 A | 9/2011 |

(Continued)

*Primary Examiner* — Joseph Chang
(74) *Attorney, Agent, or Firm* — Finnegan, Henderson, Farabow, Garrett & Dunner, L.L.P.

(57) ABSTRACT

A wireless power transmission device related to embodiments of the present invention includes a plurality of power transmission resonators, a communicator, a power transmission controller and a power transmission circuit.
The communicator receives information related to a power receiving resonator provided in a power receiving device.
The power transmission controller selects a power transmission resonator to be used in power transmission from the plurality of power transmission resonators based on the information related to the power receiving resonator.
The power transmission circuit transmits an electric current to the power transmission resonator to be used in the power transmission.

16 Claims, 11 Drawing Sheets

(56) References Cited

U.S. PATENT DOCUMENTS

2016/0297305 A1   10/2016  Ichikawa
2017/0093217 A1*  3/2017  Cho ........................ H02J 7/025

FOREIGN PATENT DOCUMENTS

| JP | 2013-17274 A | 1/2013 |
|----|--------------|--------|
| JP | 2013-121258 A | 6/2013 |
| JP | 2014-110726 | 6/2014 |
| JP | 2014-176125 A | 9/2014 |
| JP | 2014-180078 A | 9/2014 |
| JP | 2015-116035 A | 6/2015 |
| JP | 2015-116084 A | 6/2015 |

* cited by examiner

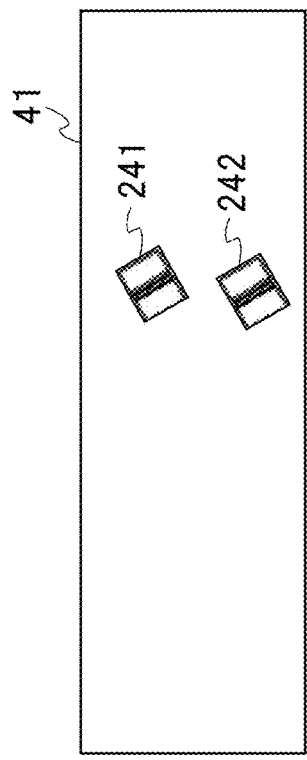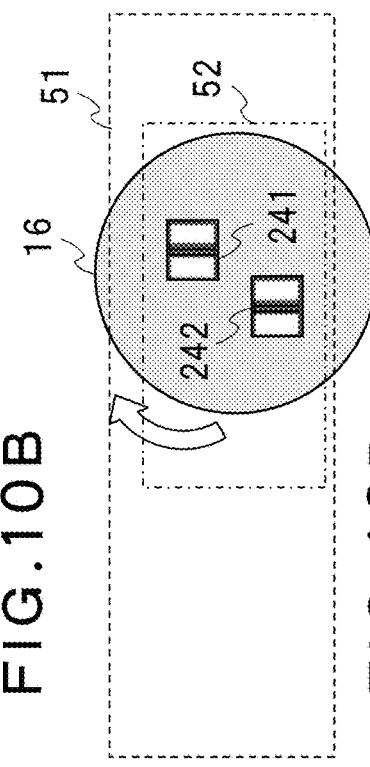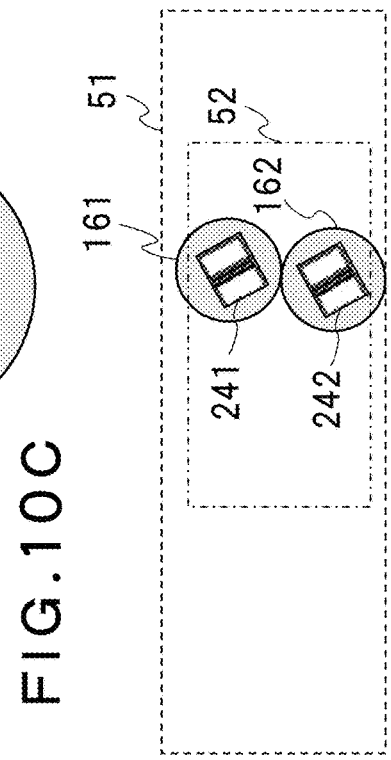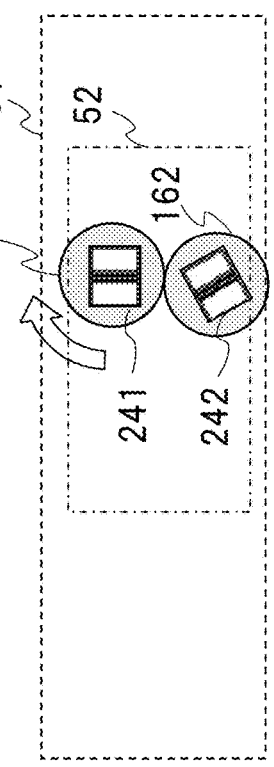

WIRELESS POWER TRANSMISSION DEVICE, WIRELESS POWER TRANSMISSION METHOD, NON-TRANSITORY COMPUTER READABLE MEDIUM AND WIRELESS POWER TRANSMISSION SYSTEM

CROSS-REFERENCE TO RELATED APPLICATION(S)

This application is based upon and claims the benefit of priority from Japanese Patent Application No. 2016-049977, filed Mar. 14, 2016; the entire contents of which are incorporated herein by reference.

FIELD

Embodiments described herein relate generally to a wireless power transmission device, a wireless power transmission device method, a non-transitory computer readable medium and wireless power transmission system.

BACKGROUND

In recent years, with the popularization of electric vehicles, development of a wireless power transmission device that supplies electric power by radio waves has been advanced. In a resonance system known as one of wireless power transmission methods, both a power source as a power transmitter and an electric vehicle as a power receiver include a resonator, and produce resonance in the resonators, to thereby increase a distance over which power can be transmitted.

In the resonance system, the wireless power transmission is performed with combination of one power transmission resonator and one power receiving resonator. However, configuration of a power receiving device is not necessarily the same as always. For example, there is a case in which a regular passenger vehicle has one power receiving resonator, but a large passenger vehicle, such as a bus, has two or more power receiving resonators. As seen from the above, there is a problem that power transmission devices are selectively used for dealing with multiple power receiving devices with different configurations.

BRIEF DESCRIPTION OF THE DRAWINGS

FIGS. 10A to 10F are diagrams illustrating a movable part;

DETAILED DESCRIPTION

A wireless power transmission device related to embodiments of the present invention includes a plurality of power transmission resonators, a communicator, a power transmission controller and a power transmission circuit.

The communicator receives information related to a power receiving resonator provided in a power receiving device.

The power transmission controller selects a power transmission resonator to be used in power transmission from the plurality of power transmission resonators based on the information related to the power receiving resonator.

The power transmission circuit transmits an electric current to the power transmission resonator to be used in the power transmission.

The embodiments of the present invention provide a wireless power transmission device capable of performing wireless power transmission also for multiple power receiving devices with different configurations.

Below, a description is given of embodiments of the present invention with reference to the drawings. The present invention is not limited to the embodiments.

(First Embodiment)

Figure 1:
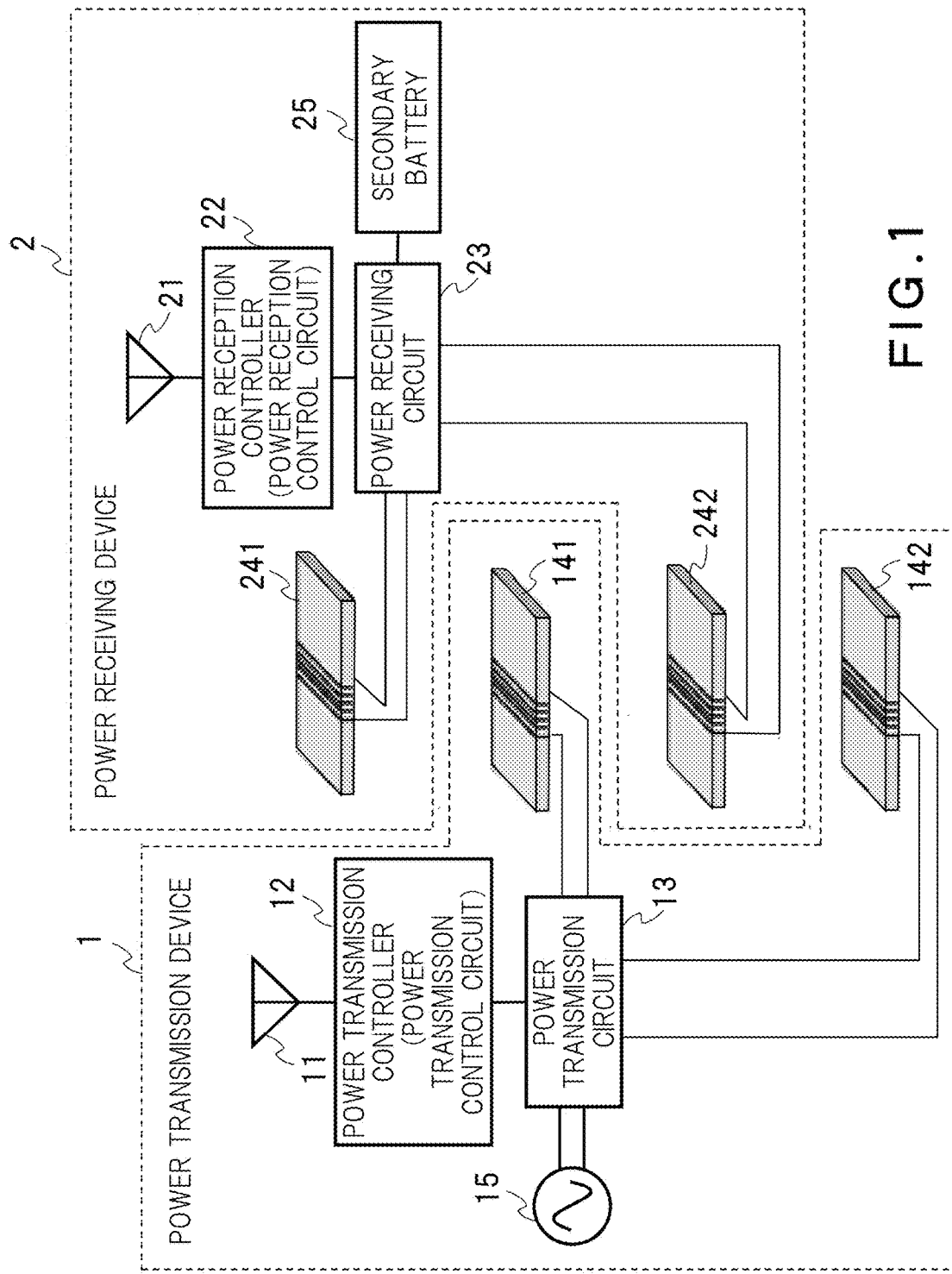
FIG. 1 is a block diagram showing an example of an overall configuration of a power transmission device and a power receiving device related to a first embodiment.

FIG. 1 is a block diagram showing an example of an overall configuration of a power transmission device (wireless power transmission device) 1 and a power receiving device 2 related to a first embodiment.

The power transmission device 1 includes an antenna part (communicator) 11, a power transmission controller (power transmission control circuit) 12, a power transmission circuit 13, a power transmission resonator 14 and an AC power source 15. Note that the power transmission device 1 shown in FIG. 1 is assumed to have two power transmission resonators 14, namely, a first power transmission resonator 141 and a second power transmission resonator 142; however, three or more power transmission resonators 14 may be included. Though the number of power transmission resonators 14 is different, each process performed by the power transmission device 1 is the same.

The power receiving device 2 includes an antenna part (communicator) 21, a power reception controller (power reception control circuit) 22, a power receiving circuit 23, a power receiving resonator 24 and a secondary battery 25. Note that the power receiving device 2 shown in FIG. 1 is assumed to have two power receiving resonators 24, namely, a first power receiving resonator 241 and a second power receiving resonator 242; however, one power receiving resonator 24, or, three or more power transmission resonators 24 may be included. Though the number of power receiving resonators 24 is different, each process performed by the power receiving device 2 is the same.

The power transmission device 1 performs wireless power transmission to the power receiving device 2. The power receiving device 2 receives power from the power transmission device 1.

It is assumed that there are multiple power receiving devices 2 to which the power transmission device 1 transmits power. There can be a case in which the configuration of the power receiving device 2 such as the number of the power receiving resonators is different from others. However, the power transmission device 1 is able to perform power transmission in accordance with the configuration of the power receiving device 2. Therefore, one power transmission device 1 can deal with the multiple power receiving devices 2. Note that the power transmission device 1 is assumed to perform power transmission to each the multiple power receiving devices 2 one by one.

Note that, in the following description, if not otherwise specified, it is assumed that "resonator" includes "power transmission resonator" and "power receiving resonator". Moreover, if not otherwise specified, it is assumed that "power transmission resonator" Includes all of the power transmission resonators provided to the power transmission device 1. Moreover, if not otherwise specified, it is assumed that "power receiving resonator" includes all of the power receiving resonators provided to the power receiving device 2.

A description will be given of Internal configurations of the power transmission device 1 and the power receiving device 2.

The antenna part 11 of the power transmission device 1 and the antenna part 21 of the power receiving device 2 are used for performing wireless communication between the power transmission device 1 and the power receiving device 2. The power transmission device 1 receives information related to the power receiving resonator 24 from the power receiving device 2. Moreover, the power transmission device 1 transmits information related to power transmission to the power receiving device 2.

The Information related to the power receiving resonator 24 includes the number, the type, the status, or specification, such as power consumption, of power receiving resonators 24. The information related to the power transmission includes instructions to the power receiving device 2 and so forth.

Note that, in this embodiment, it is assumed that the power transmission device 1 and the power receiving device 2 perform communication by wireless communication. However, the power transmission device 1 only necessary to obtain the Information related to the power receiving resonator 24; therefore, the power transmission device 1 may obtain the information related to the power receiving resonator 24 via any other device not shown in the figure. Moreover, the communication may be performed, not by wireless communication, but by wire communication.

The power transmission controller 12 (power transmission control circuit) of the power transmission device 1 selects a power transmission resonator 14 to be used in power transmission from the plurality of power transmission resonators 14 based on the obtained information related to the power receiving resonator 24.

In this embodiment, power transmission is performed by combination of a single power transmission resonator 14 and a single power receiving resonator 24. Therefore, when the number of usable power transmission resonators 14 is larger than the number of usable power receiving resonators 24, there is a surplus of power transmission resonators 14; thereby, the surplus power transmission resonators 14 pose an obstacle to wireless power transmission. Accordingly, when the number of usable power transmission resonators 14 is larger than the number of usable power receiving resonators 24, the power transmission controller 12 selects the power transmission resonators 14 to be used in power transmission of this time from all of the power transmission resonators 14 so that the number of the power transmission resonators 14 and power receiving resonators 24 to be used in power transmission of this time are the same.

Meanwhile, when the number of usable power transmission resonators 14 is smaller than the number of usable power receiving resonators 24, the power transmission controller 12 may also select the power receiving resonators 24 to be used in power transmission from the usable power receiving resonators 24. Moreover, the power transmission controller 12 may transmits information of power receiving resonators 24 to be used in power transmission to the power receiving device 2.

Note that the power reception controller 22 may select the power receiving resonators 24 to be used in power transmission.

When the power reception controller 22 is notified that the number of usable power transmission resonators 14 is smaller than the number of usable power receiving resonators 24, the power reception controller 22 may select the power receiving resonators 24 to be used in power transmission from the usable power receiving resonators 24, and may notify the power receiving resonators 24 to be used in power transmission to the power transmission controller 12.

Selection of the resonators used in power transmission may be performed randomly, or may be performed based on a predetermined degree of priority. For example, the resonators are provided with degrees of priority in advance, and the power transmission controller 12 or the power reception controller 22 may select the resonators used in the power transmission in order of the degree of priority. As the degree of priority, multiple types may be defined by respective items to take priority, such as, the type of the resonator, power consumption, or a charging time. Consequently, for example, when power consumption of the power transmission device 1 takes priority, the power transmission resonator 14 with low power consumption is used preferentially, and when the charging time takes priority, the power transmission resonator 14 capable of reducing the charging time used preferentially.

The method of selecting the resonators used in the power transmission, the degree of priority and the like may be defined in the power transmission controller 12 or the power reception controller 22 in advance, or may be accepted from other devices via the antenna part 11 or the antenna part 21.

The power transmission controller 12 makes up the number of the power transmission resonators 14 and the number of the power receiving resonators 24 used in the power transmission, and thereafter, determines combinations of the power transmission resonators 14 and the power receiving resonators 24 to perform the power transmission. Similar to the method of selecting resonators to be used in the power transmission, the combinations of the power transmission resonators 14 and the power receiving resonators 24 to perform the power transmission may be optionally determined.

In this manner, since the power transmission resonators to be used in the power transmission are selected in accordance with the number, type or others of the power receiving resonators of the power receiving device 2 to be used in the power transmission of this time, a single power transmission device 1 is also capable of performing power transmission to multiple power receiving devices 2 with different configurations of the power receiving resonators 24.

The power transmission controller 12 may suspend the operations of the power transmission resonators 14 that are not used in the power transmission. The term "suspension" here means a state in which the electric current flowing through the power transmission resonator 14 is zero or suppressed as possible. The term "suppressed state" means that the electric current that flows after suspension is at least smaller than the electric current flowing before suspension. Consequently, power consumption in the power transmission resonators 14 after suspending the operations is suppressed than that before suspension, and accordingly, the power consumption in the power transmission resonators 14 not used in the power transmission can be reduced. Note that the power transmission controller 12 suspends the operations of the power transmission resonators 14 not used in the power transmission by issuing an instruction of suspension to the power transmission circuit 13.

Note that the term "operations" includes, other than transmission and reception of power for power transmission, processing other than the power transmission, such as active cancellation in the second embodiment to be described later, standby, and so forth.

The power reception controller 22 may suspend the operations of the power receiving resonators 24 that are not used in the power transmission. The term "suspension" here means a state in which the electric current from the power receiving resonator 24 is not outputted via the power receiving circuit. Note that the power reception controller 22 suspends the operations of the power reception resonators 24 not used in the power transmission by issuing an instruction of suspension to the power receiving circuit 23.

Moreover, the power transmission controller 12 or the power reception controller 22 may perform abnormality determination on each resonator. The resonator determined to be abnormal by the abnormality determination is regarded as a resonator not to be used in the power transmission. The method of abnormality determination may be optionally provided, and a publicly-known technique may be used. For example, a test for determination may be conducted. Alternatively, analysis of a log recording the states of the resonator may be performed.

Hereinafter, a description will be given on the assumption that the power transmission controller 12 performs abnormality determination on both of the power transmission resonators 14 and the power receiving resonators 24. However, it may be possible that the power transmission controller 12 performs abnormality determination of the power transmission resonators 14, and the power reception controller 22 performs abnormality determination of the power receiving resonators 24 and notifies the results of abnormality determination to the power transmission controller 12.

Upon receiving the Instruction from the power transmission controller 12, the power transmission circuit 13 of the power transmission device 1 sends the electric current from the AC power source 15 to the instructed power transmission resonators 14. This switches the operations of the power transmission resonators 14.

As a configuration, it is conceivable that the power transmission circuit 13 includes a transformer, a converter, an inverter or others. An existing power transmission circuit may be used which is able to pass electric current to each of the power transmission resonators 14 with a magnitude capable of generating a magnetic field sufficient to perform power transmission and is also able to cut the current or to pass the current with nearly zero. Moreover, the AC power source 15 is not particularly limited.

When the power reception controller 22 suspends power receiving resonators 24 upon receiving the instruction from the power transmission controller 12, the power reception controller 22 issues an Instruction of suspension to the power receiving circuit 23.

The power receiving circuit 23 of the power receiving device 2 receives the electric current generated from the power receiving resonators 24, and brings the secondary battery 25 into conduction. Accordingly, the secondary battery 25 is charged.

As a configuration, it is conceivable that the power receiving circuit 23 includes a rectification circuit, a chopper circuit or others. An existing power receiving circuit 23 may be used which does not bring the secondary battery 25 into conduction of the electric current from the power receiving resonators.

Moreover, the secondary battery 25 is not particularly limited, either.

The power transmission resonator 14 of the power transmission device 1 includes a coil, and generates a magnetic field by the electric current sent from the power transmission circuit 13. The power receiving resonator 24 of the power receiving device 2 includes a coil, and generates electric current by the magnetic field. This performs wireless power transmission.

In the coils used in the power transmission resonator 14 and the power receiving resonator 24, there are types, such as a solenoid type and a spiral type, and a coil of an arbitrary type may be used. FIGS. 2A to 2D are diagrams showing examples of combination of the power transmission resonators 14 and the power receiving resonators 24 for performing power transmission. The power transmission resonators 14 are on the lower side, and the power receiving resonators 24 are on the upper side. The arrow indicates a magnetic flux penetrating the coll.

Figure 2A:
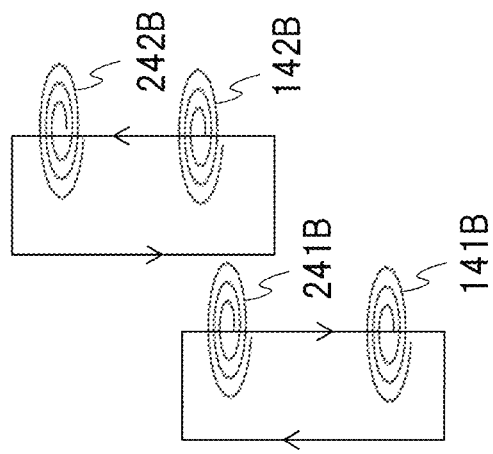
FIGS. 2A to 2D are diagrams showing examples of combination of a power transmission resonator and a power receiving resonator for performing power transmission.
Figure 2B:
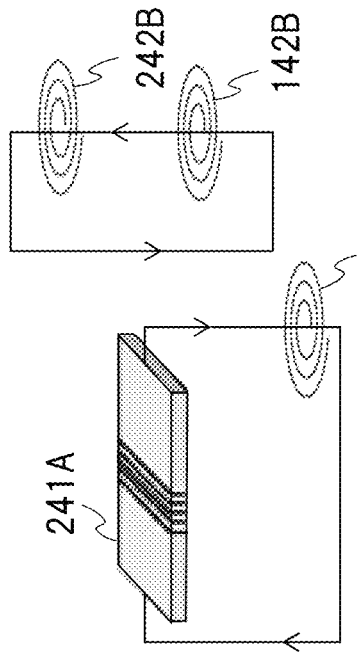
Figure 2C:
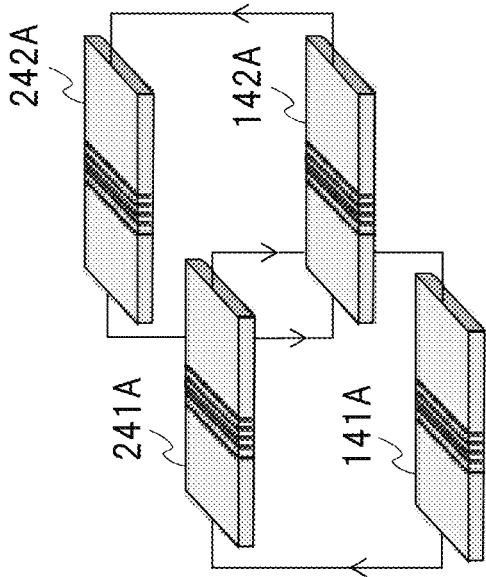
Figure 2D:
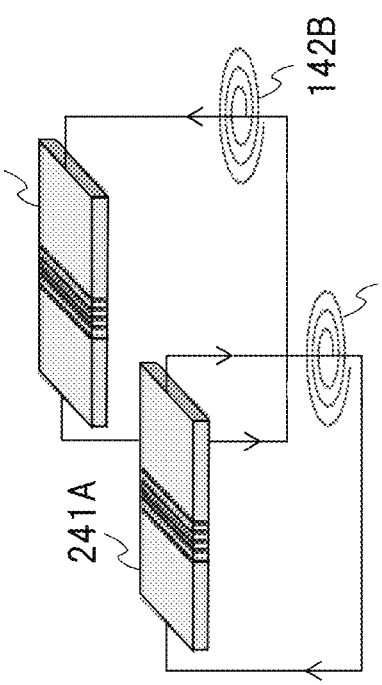

FIG. 2A shows an example including the solenoid type power transmission resonators 14 and also the solenoid type power receiving resonators 24. FIG. 2B shows an example including the spiral type power transmission resonators 14 and also the spiral type power receiving resonators 24. FIG. 2C shows an example including the spiral type power transmission resonators 14 and the solenoid type power receiving resonators 24. FIG. 2D shows an example including the spiral type power transmission resonators 14 and the power receiving resonators 24, one of which is of the solenoid type and the other is of the spiral type. In FIGS. 2A to 2D, each power transmission resonator 14 and each power receiving resonator 24 can be replaced with each other.

As shown in FIGS. 2A to 2D, the types of coils in the respective power transmission resonators 14 or in the respective power receiving resonators 24 may be the same or may be different. Moreover, in the combinations of the power transmission resonator 14 and the power receiving resonator 24 to perform the power transmission, the types of coils may be the same or may be different. The same applies to the subsequent embodiments.

Note that, in FIGS. 2A to 2D, examples are shown in which the power transmission is performed by use of the two power transmission resonators 14 and the two power receiving resonators 24; however, as described above, the number of the power transmission resonators 14 may be two or more and the number of the power receiving resonators 24 may be one or more, and the types of the coils and combination thereof are not limited by the number of resonators.

Moreover, the power consumption, charging time or others of each resonator may be different by each resonator.

Figure 3:
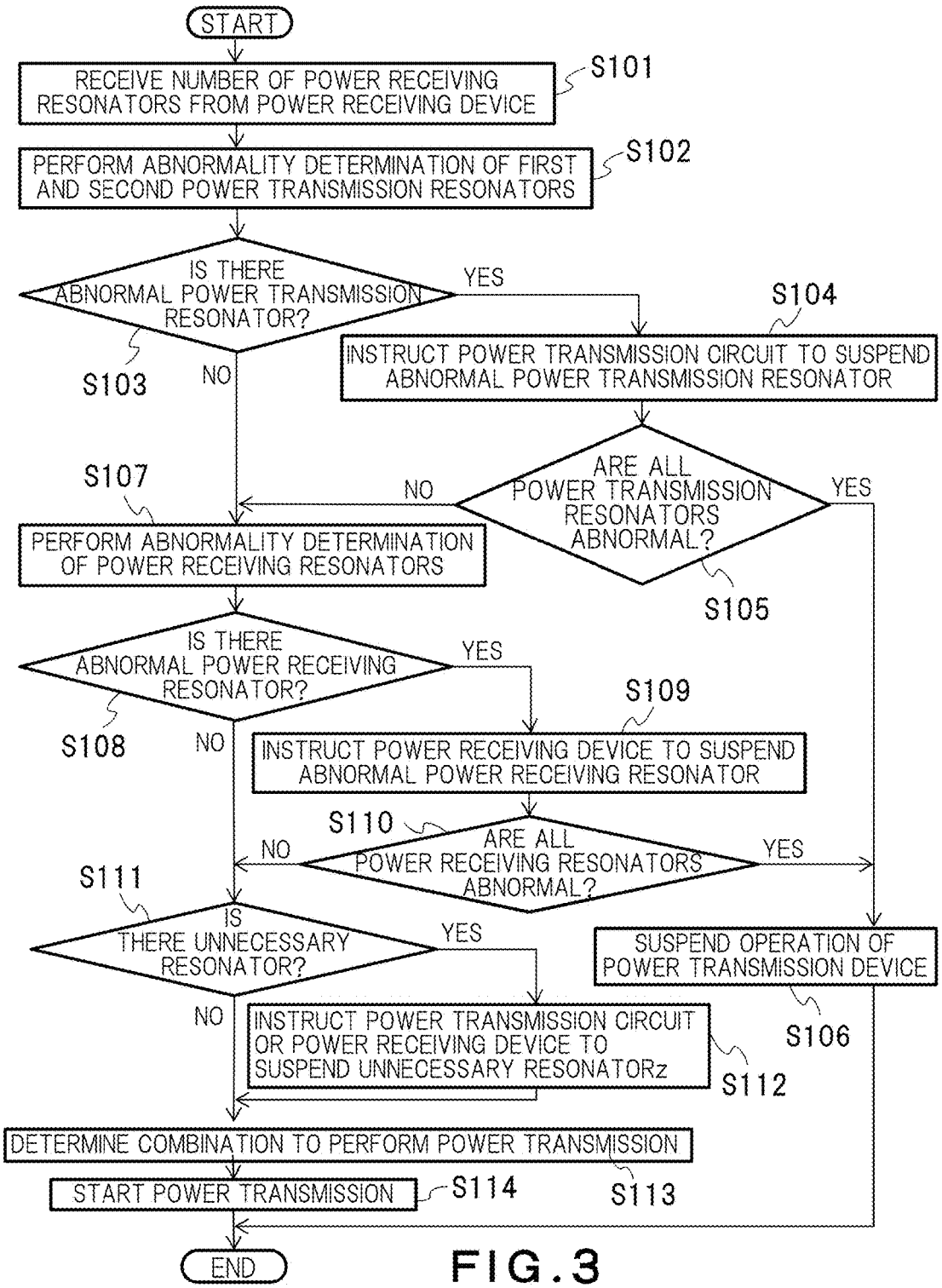
FIG. 3 is an overall flowchart showing entire processing of the power transmission device related to the first embodiment.

FIG. 3 is an overall flowchart showing entire processing of the power transmission device 1 related to the first embodiment. This flow starts at the time when wireless communication between the power transmission device 1 and the power receiving device 2, such as a power transmission request from the power receiving device 2, is made.

The power transmission controller 12 receives information related to the power receiving resonators 24, such as the number of the power receiving resonators 24, from the power receiving device 2 (S101). Next, the power transmission controller 12 performs abnormality determination of operations of the power transmission resonators 14 (S102). When there is any power transmission resonator 14 that is found to be abnormal by the abnormality determination (YES in S103), the power transmission controller 12 instructs the power transmission circuit 13 to suspend the abnormal power transmission resonator 14 (S104). Then, if all the power transmission resonators 14 are abnormal (YES in S105), the power transmission controller 12 suspends operations of the power transmission device 1 itself (S106).

When all the power transmission resonators 14 are not abnormal (NO in S103), the power transmission controller 12 performs abnormality determination of operations of the power receiving resonators 24 (S107). When there is any power receiving resonator 24 that is recognized to be abnormal by the abnormality determination (YES in S108), the power transmission controller 12 instructs the power receiving device 2 to suspend the abnormal power receiving resonator 14 (S109). Then, if all the power receiving resonators 24 are abnormal (YES in S110), the power transmission controller 12 suspends the power transmission device 1 itself (S106).

When there are no abnormal power receiving resonators 24 (NO in S108) or not all the power receiving resonators 24 are abnormal (NO in S110), the power transmission controller 12 ascertains the numbers of normal power transmission resonators 14 and normal power receiving resonators 24 (S111). If the numbers do not coincide with one another and there is any unnecessary resonator not used in the power transmission (YES in S111), the power transmission controller 12 issues an instruction to the power transmission circuit 13 or the power receiving device 2 to suspend the unnecessary resonator (S112). After the process of S112, or there is no unnecessary resonator (NO in S111), combinations by which the power transmission is performed are determined (S113), and based on the information from the power transmission controller 12, the power transmission circuit 13 passes electric current to the power transmission resonators 14, to thereby start the power transmission (S114).

In this manner, the power transmission controller 12 determines the operations of the power transmission resonators 14, and therefore, a single power transmission device 1 is also capable of performing wireless power transmission to multiple power receiving devices 2 with different configurations of the power receiving resonators 24.

Note that the flowchart in each embodiment described here is merely an example, and the present invention is not limited thereto. For example, it may be possible that the abnormality determination of the power transmission resonators 14 and the abnormality determination of the power receiving resonators 24 are conducted first, and after the combinations of the power transmission resonators 14 and the power receiving resonators 24 for performing power transmission are determined, the abnormal resonators and the resonators not to be used are notified to the power transmission circuit 13 or the power receiving device 2 at once.

Note that, here, the flowchart shows a flow of processing before starting the power transmission; however, the flow may be started when resonators used in the power transmission are determined to be abnormal after the power transmission is started.

As described above, according to the first embodiment, the power transmission device 1 includes at least two power transmission resonators 14, recognizes the number of the power receiving resonators 24 provided to the power receiving device 2 or others to thereby switch operations of the power transmission resonators 14, and thereby, the single power transmission device 1 is also capable of performing wireless power transmission to multiple power receiving devices 2 with different configurations of the power receiving resonators 24. Moreover, by suspending the surplus power transmission resonators 14, the power consumption of the power transmission device 1 can be reduced.

(Second Embodiment)

In the first embodiment, when the number of usable power transmission resonators 14 of the power transmission device 1 was larger than the number of usable power receiving resonators 24 of the power receiving device 2, the surplus power transmission resonators 14 were suspended as being unnecessary. In the second embodiment, in the above case, the surplus power transmission resonators 14 are operated as active cancellation resonators.

The power transmission device 1 in the second embodiment has a configuration same as that of the power transmission device 1 in the first embodiment, and is different only in the point that the surplus power transmission resonators 14 are operated as active cancellation resonators.

Descriptions will be omitted about parts and processes same as those in the first embodiment.

Figure 4:
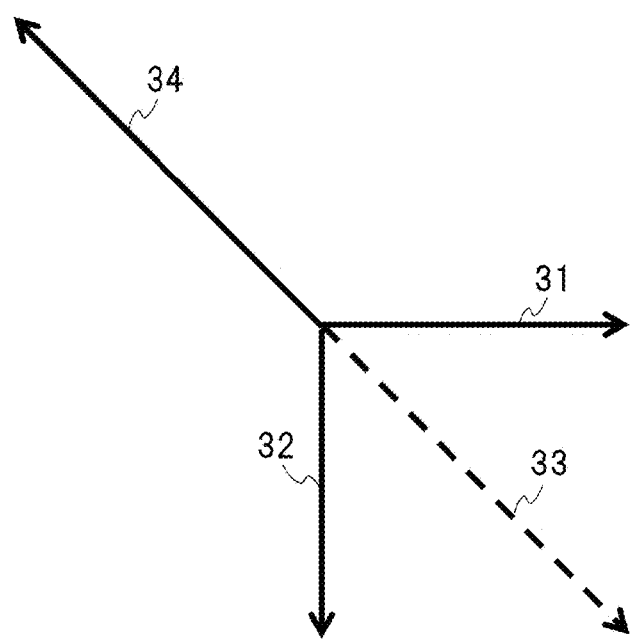
FIG. 4 is a diagram illustrating working of an active cancellation resonator.

The active cancellation resonator means a power transmission resonator 14 that generates an electromagnetic field canceling leakage of an electromagnetic field generated due to the power transmission by the power transmission resonators 14 and the power receiving resonators 24. FIG. 4 is a diagram illustrating working of the active cancellation resonator. In FIG. 4, it is assumed that the first power transmission resonator 141 and the first power receiving resonator 241 perform the power transmission, and the second power transmission resonator 142 is not used for the power transmission, to thereby serve as an active cancellation resonator. Moreover, it is assumed that a current phase difference between the first power transmission resonator 141 and the first power receiving resonator 241 is 90 degrees, and the current strengths in the currents flowing through the first power transmission resonator 141 and the first power receiving resonator 241 are the same.

The right-pointing solid arrow in FIG. 4 indicates an electromagnetic field vector 31 caused by the first power transmission resonator 141. The downward solid arrow in FIG. 4 indicates an electromagnetic field vector 32 caused by the first power receiving resonator 241. Since the current phase difference between the first power transmission resonator 141 and the first power receiving resonator 241 is assumed to be 90 degrees, the electromagnetic field vector 31 and the electromagnetic field vector 32 are intersecting at right angles. Moreover, since the current strengths in the currents flowing through the first power transmission resonator 141 and the first power receiving resonator 241 are assumed to be the same, the lengths of the electromagnetic field vector 31 and the electromagnetic field vector 32 are the same.

The obliquely right-downward dotted arrow existing between the electromagnetic field vector 31 and the electromagnetic field vector 32 indicates a composite electromagnetic field vector 33 generated by the electromagnetic field vector 31 and the electromagnetic field vector 32. The composite electromagnetic field vector 33 corresponds to the leakage of the electromagnetic field. The solid arrow heading in a direction opposite to the composite electromagnetic field vector 33 indicates an electromagnetic field vector 34 generated by the active cancellation resonator. In this way, the second power transmission resonator 142 serving as the active cancellation resonator generates the electromagnetic field vector 34 that has the same magnetic field strength as the composite electromagnetic field vector 33 and is in the direction 180 degrees different from the composite electromagnetic field vector 33 into space.

This makes it possible to cancel the composite electromagnetic field vector 33 and reduce the strength of leakage of the electromagnetic field in the space.

Upon receiving an instruction from the power transmission controller 12, the power transmission circuit 13 controls the current phase and the current strength of the power transmission resonator 14 operating as the active cancellation resonator.

Figure 5:
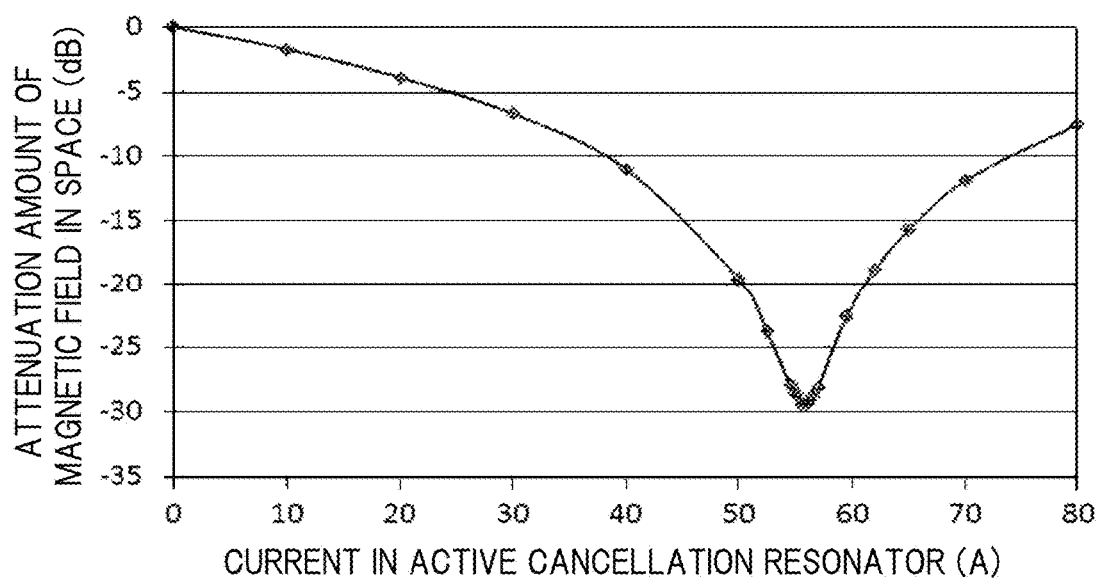
FIG. 5 is a diagram illustrating effects of the active cancellation resonator.

FIG. 5 is a diagram illustrating effects of the active cancellation resonator. The horizontal axis in FIG. 5 indicates the current flowing through the second power transmission resonator 142 serving as the active cancellation resonator, and the vertical axis in FIG. 5 indicates an attenuation amount of the magnetic field strength measured at an observation point at a distance about 10 m away from the first power transmission resonator 141 and the second power transmission resonator 142. The attenuation amount of the magnetic field strength is obtained with the magnetic field strength when no current flows through the active cancellation resonator as a reference. Moreover, here, it is assumed that the current strength and the current phase flowing through each of the first power transmission resonator 141 and the first power receiving resonator 241 are fixed for the sake of convenience.

When the current flowing through the active cancellation resonator is increased, the strength of leakage of the electromagnetic field in the space is gradually attenuated due to the effects of canceling the leakage of the electromagnetic field by the active cancellation resonator. In the example in FIG. 5, the canceling effect becomes maximum when the current flowing through the active cancellation resonator is 56 A. If the current flowing through the active cancellation resonator further increases from 56 A, the strength of leakage of the electromagnetic field increases. This is because the strength of the electromagnetic field generated in the space by the active cancellation resonator exceeds the strength of the composite electromagnetic field generated in the space by the first power transmission resonator 141 and the first power receiving resonator 241. Therefore, to obtain the effects of reducing the strength of leakage of the electromagnetic field by the active cancellation resonator to the maximum, it is necessary to make the strength of the electromagnetic field by the active cancellation resonator and the strength of the composite electromagnetic field the same. In this example, as compared to the case in which the second power transmission resonator 142 is not operated as the active cancellation resonator, the effects of attenuating the magnetic strength in the space about 30 dB to the maximum can be obtained.

Note that the effect of reducing the leakage of the electromagnetic field is large when orientations of aperture planes of coils in the resonators canceling the electromagnetic fields thereof each other are aligned.

Note that the power transmission controller 12 may determine whether the surplus power transmission resonator 14 is operated as the active cancellation resonator or is suspended. For example, when the power consumption of the power transmission device 1 takes priority, the power transmission controller 12 determines that the surplus power transmission resonator 14 is not operated as the active cancellation resonator.

The determination method and determination criteria or the like in the above-described determination may be defined in the power transmission controller 12 in advance, or may be accepted from the power receiving device 2 or other communication devices. The determination criteria may be changed in accordance with time, season, circumferential environment or others.

Moreover, for example, when reduction of strength of leakage of the electromagnetic field takes priority, it may be possible that, first, the power transmission resonator 14 capable of reducing the strength of leakage of the electromagnetic field most is determined to be operated as the active cancellation resonator, and thereafter, the power transmission resonator 14 for performing power transmission is determined. In this manner, by giving priority to the obtained effects, determination may be made whether the power transmission resonator 14 is used as the active cancellation resonator or is used for power transmission.

Moreover, if there is no power transmission resonator 14 usable as the active cancellation resonator, the power transmission controller 12 may prioritize reduction of the strength of leakage of the electromagnetic field more than the charging time, and may adjust the strength of leakage of the electromagnetic field to be the desired strength or less by reducing the power to be transmitted.

Figure 6:
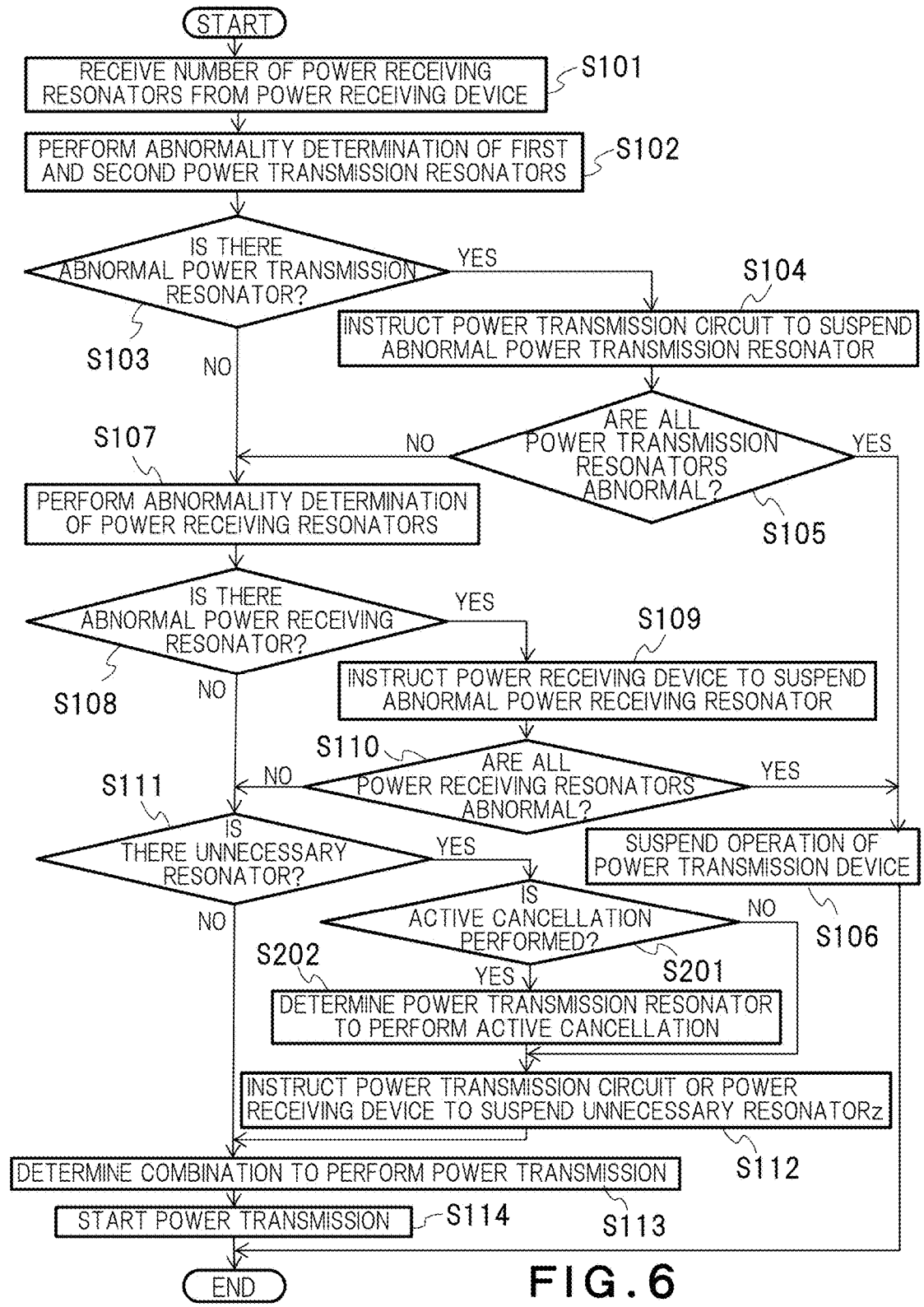
FIG. 6 is an overall flowchart showing entire processing of a power transmission device related to a second embodiment.

FIG. 6 is an overall flowchart showing entire processing of the power transmission device 1 related to the second embodiment. Similar to the first embodiment, this flow starts at the time when wireless communication between the power transmission device 1 and the power receiving device 2 is made.

The processes up to S111, in which the power transmission controller 12 ascertains the number of normal power transmission resonators 14 and the number of normal power receiving resonators 24, are same as those in the first embodiment. In the second embodiment, when there is any unnecessary resonator (YES in S111), the power transmission controller 12 determines whether or not the active cancellation is to be performed (S201). When it is determined that the active cancellation is to be performed (YES in S201), the power transmission controller 12 determines the power transmission resonator 14 for performing the active cancellation (S202). Then, similar to the first embodiment, the power transmission controller 12 instructs the power transmission circuit 13 or the power receiving device 2 to suspend unnecessary resonators (S112).

If there is no unnecessary resonator (NO in S111) and after the process of S112, similar to the first embodiment, combinations by which the power transmission is performed are determined (S113), and based on the information from the power transmission controller 12, the power transmission circuit 13 passes electric current to the power transmission resonators 14, to thereby start the power transmission (S114).

As described above, according to the second embodiment, by using the power transmission resonator 14 not used for the power transmission as the active cancellation resonator, the strength of the electromagnetic field leaking to the space can be reduced.

(Third Embodiment)

In the second embodiment, the strength of leakage of the electromagnetic field generated by a pair of power transmission resonator 14 and power receiving resonator 24 was reduced by the active cancellation resonator. In the third embodiment, when two pairs of power transmission resonator 14 and power receiving resonator 24 perform the power transmission, the strength of leakage of the electromagnetic field is reduced by adjusting the electromagnetic fields to be canceled by each other.

The power transmission device 1 in the third embodiment has a configuration same as that of the power transmission device 1 in the first embodiment, and is different only in the point that the power transmission circuit 13 controls the current phase difference of the current flowing through the two power transmission resonators 14. Descriptions will be omitted about parts and processes same as those in the first embodiment.

When the two pairs of power transmission resonators 14 and power receiving resonators 24 perform the power transmission, the power transmission circuit 13 controls the current phase difference of the current flowing through the two power transmission resonators 14. Due to the current phase difference being controlled, directions of the electromagnetic field vectors generated by respective two pairs of power transmission resonators 14 and power receiving resonators 24 to perform the power transmission can be adjusted. Note that the power transmission controller 12 may designate the current phase difference to the power transmission circuit 13.

Figure 7:
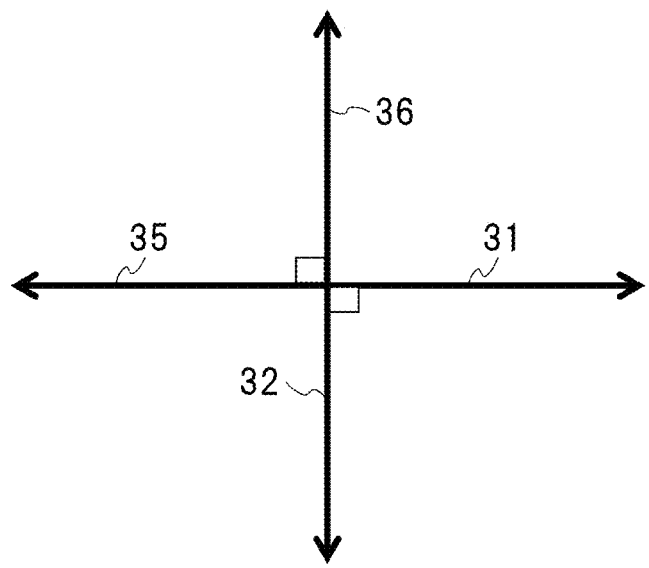
FIG. 7 is a diagram showing an example of electromagnetic field vectors formed in a space by a third embodiment.

FIG. 7 is a diagram showing an example of electromagnetic field vectors formed in a space by the third embodiment. In FIG. 7, it is assumed that the first power receiving resonator 241 receives power transmitted from the first power transmission resonator 141, and the second power receiving resonator 242 receives power transmitted from the second power transmission resonator 142. Moreover, it is assumed that the current phase difference between the power transmission resonator 14 and the power receiving resonator 24 is 90 degrees, the strength of current flowing through each resonator is the same, and a winding direction in each resonator is the same.

The right-pointing solid arrow in FIG. 7 indicates an electromagnetic field vector 31 caused by the first power transmission resonator 141. The downward solid arrow in FIG. 7 indicates an electromagnetic field vector 32 caused by the first power receiving resonator 241. The left-pointing solid arrow in FIG. 7 indicates an electromagnetic field vector 35 caused by the second power transmission resonator 142. The upward solid arrow in FIG. 7 indicates an electromagnetic field vector 36 caused by the second power receiving resonator 242.

Since the current phase difference between the power transmission resonator 14 and the power receiving resonator 24 is assumed to be 90 degrees, the electromagnetic field vector 31 and the electromagnetic field vector 32 are intersecting at right angles, and the electromagnetic field vector 35 and the electromagnetic field vector 36 are intersecting at right angles. Moreover, since the current strength of the current flowing through each resonator is assumed to be the same, the length of each electromagnetic field vector is the same.

If the power transmission circuit 13 sets the current phase difference between the current flowing through the first power transmission resonator 141 and the current flowing through the second power transmission resonator 142 to 180 degrees, the directions of the electromagnetic field vector 31 and the electromagnetic field vector 35 become opposite as shown in FIG. 7. Moreover, the directions of the electromagnetic field vector 32 and the electromagnetic field vector 36 also become opposite. This causes the electromagnetic field vectors to cancel each other, and thereby the strength of leakage of the electromagnetic field is reduced.

In this manner, by controlling the current phase difference between the first power transmission resonator 141 and the second power transmission resonator 142, it is possible to bring a state in which each electromagnetic field generated in the space by each resonator reduces each other.

Note that the current phase differences of the power transmission resonators 14 and the power receiving resonators 24 are different in accordance with the types of the resonators. When the current phase difference between the power transmission resonator 14 and the power receiving resonator 24 is 0 degrees, the current phase difference between the first power transmission resonator 141 and the second power transmission resonator 142 may be set to 180 degrees, and, when the current phase difference between the power transmission resonator 14 and the power receiving resonator 24 is 180 degrees, the current phase difference between the first power transmission resonator 141 and the second power transmission resonator 142 may be any degree.

Note that, in the above description, the electromagnetic field vectors were generated in opposite directions; however, it is sufficient to bring about a state in which the electromagnetic fields are mutually reduced, and the directions thereof may not have to be completely opposite. In other words, an electromagnetic field vector may be generated in the direction of 90 degrees to 270 degrees relative to the direction of the electromagnetic field vector to be reduced. That is, the current phase difference may be 90 degrees to 270 degrees.

Note that, when the current phase of the current flowing through each resonator is measured by, for example, a current probe, the current phase is reversed 180 degrees according to the direction of the probe.

As described above, according to the third embodiment, by controlling the current phase difference of the current flowing through the power transmission resonator 14, the respective electromagnetic field vectors generated in the space by the power transmission resonator 14 and the power receiving resonator 24 are mutually canceled, and thereby, the strength of the electromagnetic field leaking to the space can be reduced.

(Fourth Embodiment)

In the fourth embodiment, a case is assumed in which a vehicle including a power receiving device 2 (vehicle with a power receiving device) parks in a parking lot including a power transmission device 1 (chargeable parking lot), and thereby charging is carried out.

Figure 8A:
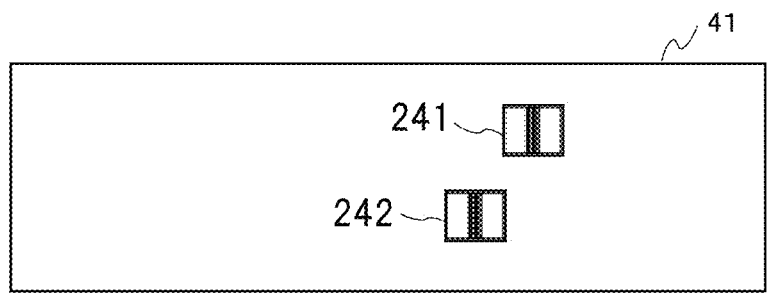
FIGS. 8A to 8C are diagrams showing an example of a vehicle with a power receiving device and a chargeable parking lot.
Figure 8B:
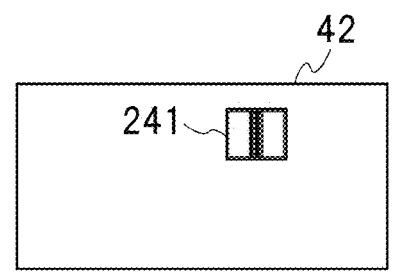
Figure 8C:
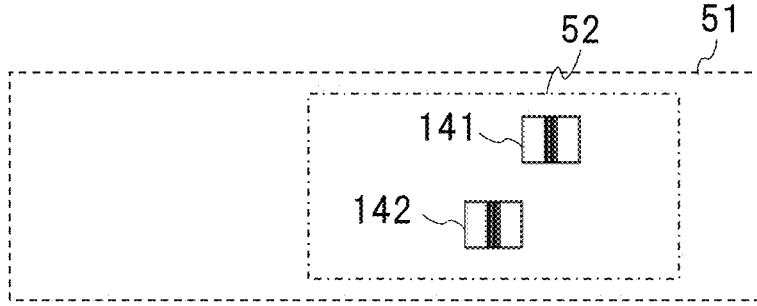

FIGS. 8A to 8C are diagrams showing an example of a vehicle with a power receiving device and a chargeable parking lot. FIG. 8A is a diagram showing a vehicle A41 including a power receiving device 2 equipped with two power receiving resonators 24, namely, a first power receiving resonator 241 and a second power receiving resonator 242. FIG. 8B is a diagram showing a vehicle B42 including a power receiving device 2 only equipped with a first power receiving resonator 241. In this way, as the vehicle with the power receiving device, the vehicle A41 and the vehicle B42 are assumed.

FIG. 8C is a diagram showing an example of a chargeable parking lot. A portion enclosed by a dotted line indicates a parking area 51 where the vehicle A41 is parked. A portion enclosed by a dot-and-dash line indicates a parking area 52 where the vehicle B42 is parked. Like this, it is assumed that the chargeable parking lot is shared by the vehicle A41 and the vehicle B42.

Note that, here, when the vehicle A41 is wirelessly charged, it is assumed that the first power receiving resonator 241 receives power transmitted from the first power transmission resonator 141, and the second power receiving resonator 242 receives power transmitted from the second power transmission resonator 142. Moreover, when the vehicle B42 is wirelessly charged, it is assumed that the first power transmission resonator 141 transmits power, and the first power receiving resonator 241 receives the power.

It is assumed that the power receiving resonator 24 of the power receiving device 2 provided to the vehicle with the power receiving device is mounted on the bottom surface of the vehicle. Moreover, the power transmission resonator 14 of the power transmission device 1 is assumed to be placed on a surface of the ground or below the ground in the chargeable parking lot.

During wireless charging, if there is any human body or foreign material between the power transmission resonator 14 and the power receiving resonator 24, electric properties are degraded, and thereby, power transmission efficiency is affected. Therefore, during wireless charging, it is desirable that the human bodies or foreign materials do not come between the power transmission resonator 14 and the power receiving resonator 24. Therefore, the power receiving resonator 24 is mounted on the bottom surface of the vehicle, and the power transmission resonator 14 is mounted at a place positioned directly below the vehicle with the power receiving device, when the vehicle with the power receiving device parks, the place being hidden behind the vehicle with the power receiving device when the vehicle with the power receiving device is viewed from directly above. Note that a position of each parts of the power transmission device 1 other than the power transmission resonator 14, such as the power transmission controller 12, is not particularly limited.

As shown in FIG. 8C, if the parking area 51 where the vehicle A41 is parked and the parking area 52 where the vehicle B42 is parked are indicated in advance by white lines or the like, both vehicles can be parked to hide the power transmission resonators 14 behind thereof as seen from directly above, and charging can be performed.

Figure 9A:
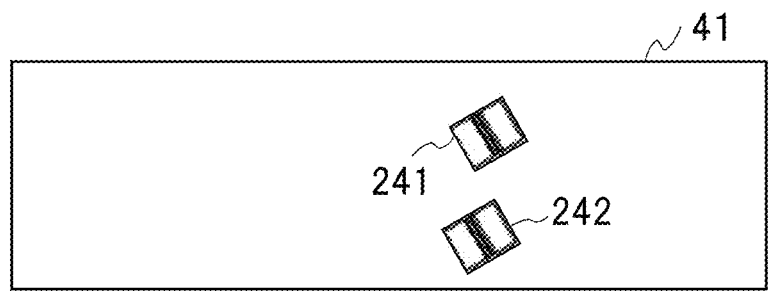
FIGS. 9A to 9C are diagrams showing another example of a vehicle with a power receiving device and a chargeable parking lot.
Figure 9B:
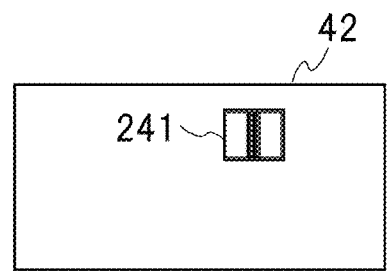
Figure 9C:
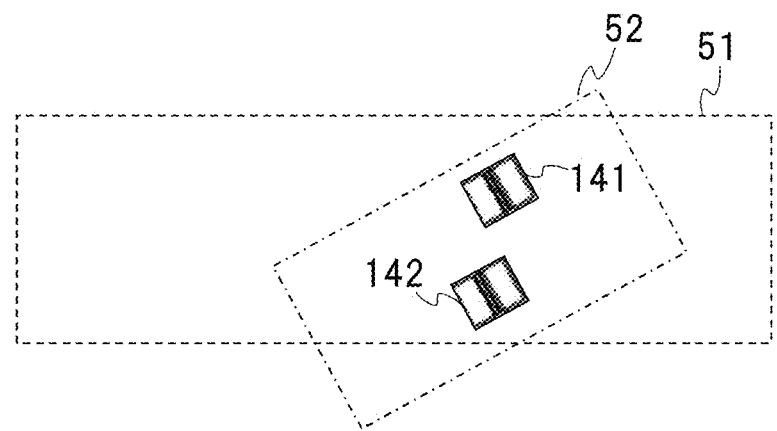

FIGS. 9A to 9C are diagrams showing another example of a vehicle with a power receiving device and a chargeable parking lot. It is assumed that two power receiving resonators 24 mounted onto the vehicle A41 shown in FIG. 9A are obliquely mounted to the vehicle body. It is assumed that, similar to FIG. 8B, a power receiving resonator 24 mounted onto the vehicle B42 shown in FIG. 9B is mounted in parallel to the vehicle body.

In this case, when the vehicle A41 and the vehicle B42 are going to share the chargeable parking lot, a parking position of one of the vehicle is relatively oblique. In FIG. 9C, the parking area 52 is positioned oblique relative to the parking area 52 in FIG. 8C. In such a case, since it is necessary to widen the parking area in the chargeable parking lot, a space-related problem occurs.

To prevent the problem, in the fourth embodiment, a movable part 16 capable of adjusting an orientation or a position of the power transmission resonator 14 is provided. FIGS. 10A to 10F are diagrams illustrating the movable part 16. FIG. 10A shows the vehicle A41 in which, similar to FIG. 9A, the two power receiving resonators 24 are mounted obliquely to the vehicle body. FIG. 10B shows the vehicle B42 in which, similar to FIG. 9B, the power receiving resonator 24 is mounted in parallel to the vehicle body.

As the movable part 16, for example, a single rotating base is considered as shown in FIGS. 10C and 10D. The power transmission resonator 14 is placed on the rotating base. Then, responding to the orientation of the power receiving resonator 24 of the vehicle, the rotating base rotates. FIG. 10C shows a state of the power transmission resonator 14 when the vehicle A41 is parked. FIG. 10D shows a state of the power transmission resonator 14 when the vehicle B42 is parked. By rotation of the movable part 16, it is possible to set the parking positions of the vehicle A41 and the vehicle B42 parallel to each other.

Moreover, the movable part 16 may be provided for each power transmission resonator 14. FIG. 10E shows a state of the power transmission device 1 including a first movable part 161 and a second movable part 162 when the vehicle A is parked. FIG. 10F shows a state of the power transmission device 1 including the first movable part 161 and the second movable part 162 when the vehicle B42 is parked. As shown in FIG. 10F, when the vehicle B42 parks, only the first movable part 161 rotates, to be able to deal with the vehicle B42. Moreover, it is possible to deal with a case in which another vehicle including the first power receiving resonator 241 and the second power receiving resonator 242 in different orientations is parked.

Moreover, the movable part 16 not only rotates, but may also adjust the position of the power transmission resonator 14. For example, the configuration may be such that the power transmission resonator 14 is placed in an underground cavity of the chargeable parking lot and a bottom surface of the power transmission resonator 14 is connected to a support pole, and accordingly, the orientation or the position of the power transmission resonator 14 is adjusted by rotation or movement of the support pole in the cavity.

The orientation or position of the power transmission resonator 14 may be adjusted before starting the power transmission. For example, it may be possible that the power transmission for testing is performed predetermined number of times while changing the orientation or position of the power transmission resonator 14, the power receiving device 2 transmits the current value obtained by the power transmission for testing to the power transmission device 1, and the power transmission device 1 adjusts the power transmission resonator 14 to be in the orientation or position in which the obtained current value is maximum. Moreover, from the obtained current value, the power transmission controller 12 may predict proper orientation or position of the power transmission resonator 14.

Figure 11A:
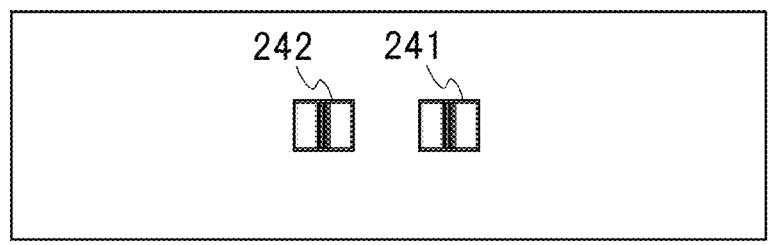
FIGS. 11A to 11C are diagrams showing a further example of a vehicle with a power receiving device and a chargeable parking lot.
Figure 11B:
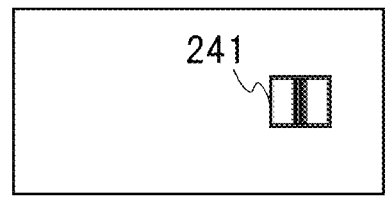
Figure 11C:
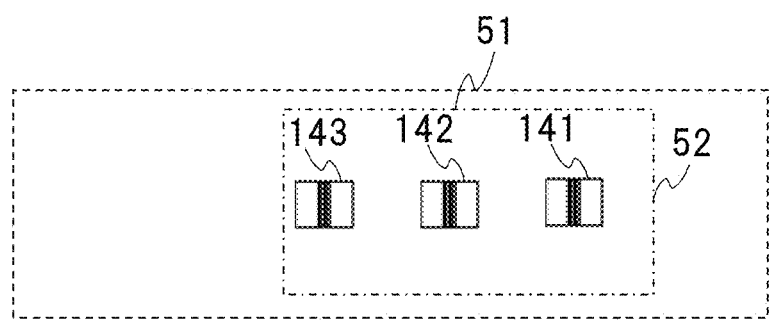

Note that, in the examples shown in FIGS. 8A to 10F, both of the vehicle A41 and the vehicle B42 receive power from the first power transmission resonator 141; the power transmission resonators 14 to be used may be divided. FIGS. 11A to 11C are diagrams showing a further example of a vehicle with a power receiving device and a chargeable parking lot.

In FIG. 11C, the power transmission device 1 includes a third power transmission resonator 143. In the vehicle A41, the first power receiving resonator 241 receives power transmitted from the second power transmission resonator 142, and the second power receiving resonator 242 receives power transmitted from the third power transmission resonator 143. In the vehicle B42, the first power receiving resonator 241 receives power transmitted from the first power transmission resonator 141. In this way, the power transmission resonators 14 to be used may be divided by each vehicle.

The power transmission controller 12 receives information of a vehicle that is to use the power transmission device 1 in advance and the information of the vehicle is notified to the power transmission controller 12 from the power receiving device 2, and therefore, the power transmission controller 12 is able to determine the power transmission resonator to be used. Moreover, it may be possible that the power transmission controller 12 conducts the power transmission test after receiving notification about starting the power transmission from the power receiving device 2 or others, and based on the result of the power transmission test, the power transmission resonator to be used is determined. Accordingly, the power transmission device 1 can be shared by the vehicles in which the positions of mounting the power receiving resonators 24 do not coincide with each other.

As described above, according to the fourth embodiment, even the multiple vehicles with the power receiving devices, in which orientations or positions of the power receiving resonators 24 mounted to the vehicles are different, can be charged by the single power transmission device 1.

(Fifth Embodiment)

In the above embodiments, the power transmission resonators 14 to be used were determined based on the predetermined degree of priority or the like. In the fifth embodiment, the power transmission resonators 14 to be used are determined from the standpoint of maintenance.

As the number of use of the resonators is increased, the risk of breakdown of the resonators increases. For example, when the first power transmission resonator 141 is always used preferentially and the second power transmission resonator 142 is not used for the power receiving device 2 with a single power receiving resonator 24, the risk of breakdown of the first power transmission resonator 141 becomes higher than that of the second power transmission resonator 142. Therefore, in spite of the fact that the sufficient number of times of availability in the second power transmission resonator 142 is left, the possibility of breakdown of the first power transmission resonator 141 and performing maintenance is increased.

To avoid such a problem, the power transmission controller 12 makes usage history of each power transmission resonator 14. For example, a count of use of each power transmission resonator 14 is taken. Then, by regarding the resonators with low counts of use as those of low degree of use and using thereof preferentially, the number of times of availability in each power transmission resonator 14 can be equalized. This makes it possible to average the risk of breakdown in the power transmission resonators 14.

Note that, as the usage history to determine the power transmission resonator 14 to be used, other than the count of use, a total use time, a total supply of power, a sum of the currents passing through the coil in the power transmission resonator 14, or others can be considered. Moreover, two or more of these information items may be combined to be settled.

Moreover, it may be possible that the power transmission controller 12 obtains the usage history of the power receiving resonator 24 from the power receiving device 2, and may select the power receiving resonator 24 to be used in the power transmission based on the usage history of the power receiving resonator 24.

The power transmission device 1 in the fifth embodiment has a configuration same as that of the power transmission device 1 in the first embodiment, and is different only in the point that the power transmission controller 12 obtains the usage history of each power transmission resonator 14. Descriptions will be omitted about parts and processes same as those in the first embodiment.

Figure 12:
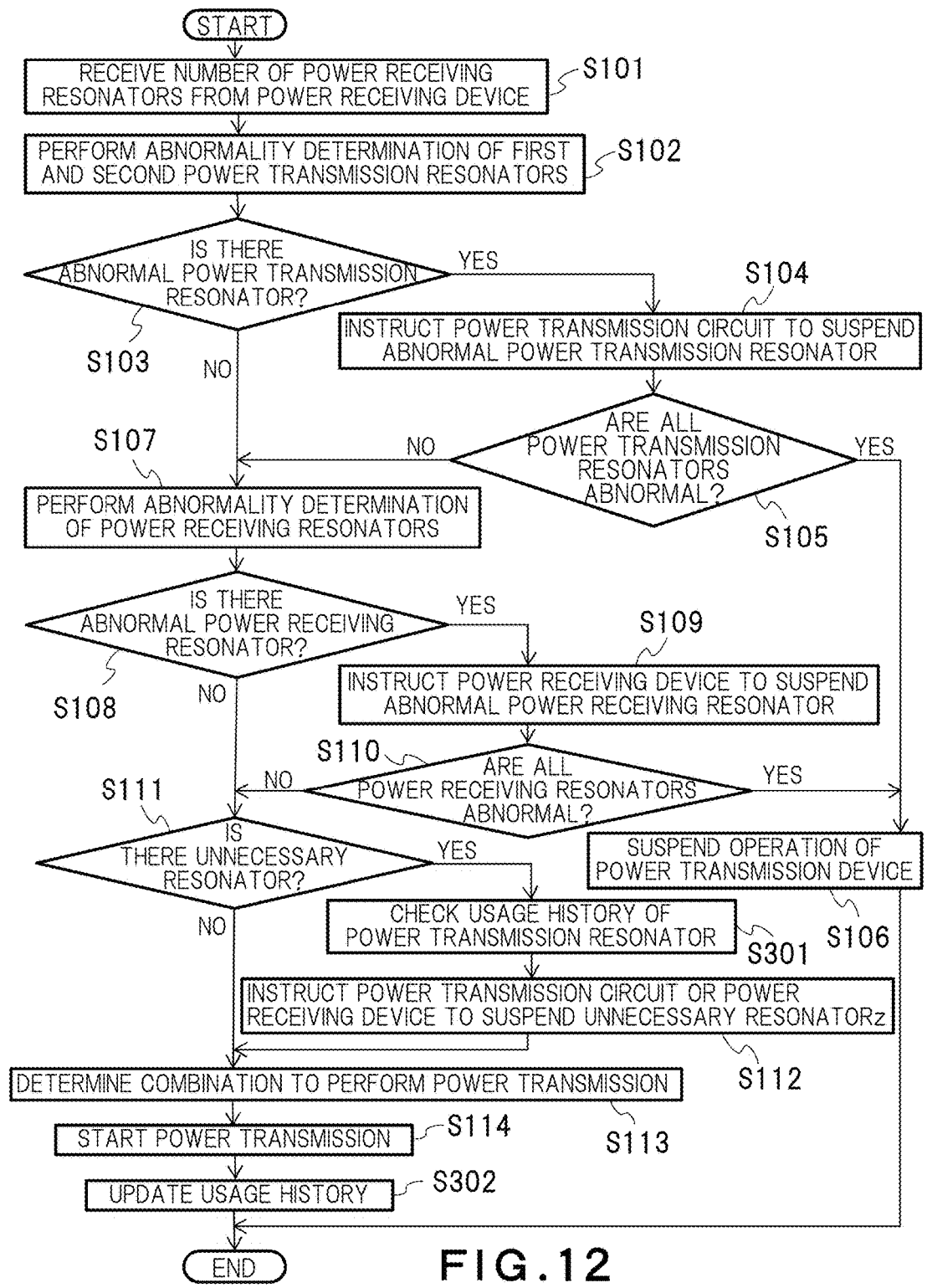
FIG. 12 is an overall flowchart showing entire processing of a power transmission device related to a fifth embodiment.

FIG. 12 is an overall flowchart showing entire processing of the power transmission device 1 related to the fifth embodiment.

Similar to the first embodiment, this flow starts at the time when wireless communication between the power transmission device 1 and the power receiving device 2 is made.

The processes up to S111, in which the power transmission controller 12 ascertains the number of normal power transmission resonators 14 and the number of normal power receiving resonators 24, are same as those in the first embodiment. In the fifth embodiment, when there is any unnecessary resonator (YES in S111), the power transmission controller 12 checks the usage history of each resonator, to thereby determine the unnecessary resonators (S301). Then, similar to the first embodiment, the power transmission controller 12 instructs the power transmission circuit 13 or the power receiving device 2 to suspend unnecessary resonators (S112).

If there is no unnecessary resonator (NO in S111) and after the process of S112, similar to the first embodiment, combinations by which the power transmission is performed are determined (S113), and based on the information from the power transmission controller 12, the power transmission circuit 13 passes electric current to the power transmission resonators 14, to thereby start the power transmission (S114). Then, the power transmission controller 12 updates the usage history of the used power transmission resonator 14 (S302). When the usage history adopts the total use time, the total supply of power, the sum of the currents passing through the coil in the resonator (used current), or others, the update of the usage history is conducted after the power transmission is completed; however, when the usage history adopts the count of use or the like, the update of the usage history may not be conducted necessarily after the power transmission is completed.

As described above, according to the fifth embodiment, the power transmission controller 12 determines the power transmission resonator 14 to be used based on the usage history. Consequently, the power transmission resonators 14 are equally used, and it is possible to prevent the situation where the risk of breakdown in the specific power transmission resonators 14 is outstandingly higher than the risk of breakdown in the other power transmission resonators 14, to thereby reduce the frequency of maintenance.

(Sixth Embodiment)

In the above embodiments, it was assumed that the power transmission resonators 14 and the power receiving resonators 24 were in one-to-one relationship, and power transmitted from a single power transmission resonator 14 was received by a single power receiving resonator 24. Therefore, the power transmission controller 12 made up the number of the power transmission resonators 14 and the number of the power receiving resonators 24. In contrast thereto, in the sixth embodiment, the number of power transmission resonators 14 and the number of power receiving resonators 24 to be used in the power transmission are not the same, and there is possibly a case in which the surplus resonators are used in the power transmission. In other words, there is a possibility that power transmitted from a single power transmission resonator 14 is received by two power receiving resonators 24 in some cases, and power transmitted from two power transmission resonators 14 is received by a single power receiving resonator 24 in some other cases.

The power transmission device 1 in the sixth embodiment has a configuration same as that of the power transmission device 1 in the first embodiment. Descriptions will be omitted about parts and processes same as those in the first embodiment.

Figure 13A:
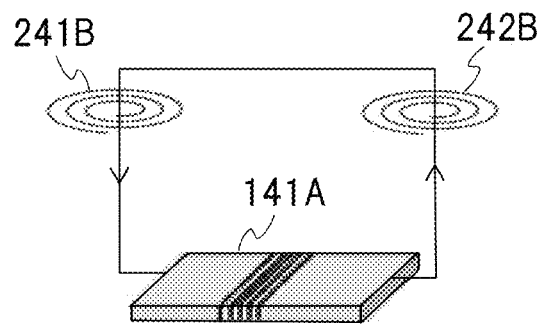
FIGS. 13A and 13B are diagrams illustrating relation between a power transmission resonator and a power receiving resonator related to a sixth embodiment.
Figure 13B:
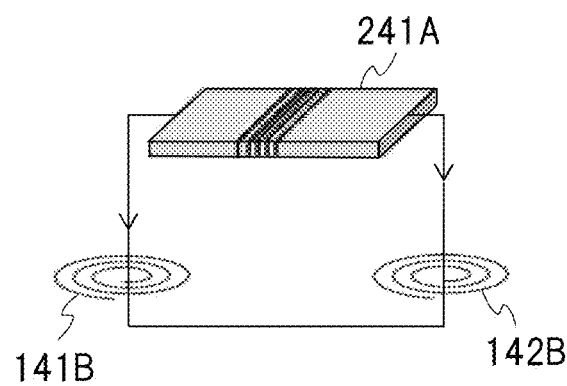

FIGS. 13A and 13B are diagrams illustrating relation between the power transmission resonator 14 and the power receiving resonator 24 related to the sixth embodiment. In FIG. 13A, the power transmission device 1 transmits power by a solenoid-type first power transmission resonator 141A, and the power receiving device 2 receives the power by a spiral-type first power receiving resonator 241B and a second power receiving resonator 242B. In FIG. 13B, the power transmission device 1 transmits power by a spiral-type first power transmission resonator 141B and a second power transmission resonator 142B, and the power receiving device 2 receives the power by a solenoid-type first power receiving resonator 241A. In this manner, if the types of coils in the power transmission resonators 14 and the power receiving resonators 24 are separated into the solenoid type and the spiral type, the surplus resonators can be used.

Moreover, in the case shown in FIG. 13A, a direction in which a magnetic flux generated in the space by the first power transmission resonator 141A penetrates the first power receiving resonator 241B and a direction in which the magnetic flux penetrates the second power receiving resonator 242B are opposite. Therefore, the electromagnetic field generated in the space by the first power receiving resonator 241B and the electromagnetic field generated in the space by the second power receiving resonator 242B cancel each other, and accordingly, the effects of reducing the strength of the electromagnetic field leaking to the space can be obtained.

Moreover, in the case shown in FIG. 13B, if the power transmission controller 12 controls the current phase difference of the currents flowing through the first power transmission resonator 141B and the second power transmission resonator 142B, the electromagnetic field generated in the space by the first power transmission resonator 141B and the electromagnetic field generated in the space by the second power transmission resonator 142B cancel each other, and the strength of the electromagnetic field leaking to the space can be reduced.

Whether or not the surplus resonators are used for the power transmission may be determined, when it is determined that there is a surplus of resonators, similar to the second embodiment, by the power transmission controller 12 based on the types of coils in the power transmission resonators 14 and the power receiving resonators 24. Moreover, whether or not the surplus resonators are used for the power transmission may be determined based on the items, such as the power consumption, to be provided with priority.

Moreover, the power transmission controller 12 may perform the power transmission for testing. If the result of testing determines that the power transmission performed in one-to-two or two-to-one resonator relationship is more efficient than the power transmission performed in one-to-one resonator relationship, the surplus resonator may be used for the power transmission. Consequently, for example, even when inefficiency is caused in the power transmission due to the positional relationship between the power transmission resonators 14 and the power receiving resonators 24, it is possible to increase the efficiency in the power transmission.

As described above, according to the sixth embodiment, the power receiving resonators 24 are configured to cause the directions, in which the magnetic flux generated in the space by the power transmission resonator 14 penetrates the power receiving resonator 24, are opposite in the first power receiving resonator 241B and the second power receiving resonator 242B, and thereby, the strength of the electromagnetic field leaking to the space can be reduced. Moreover, when the power from the two power transmission resonators 14 is received by the single power receiving resonator 24, the power transmission controller 12 changes the current phases of the currents flowing through the first power transmission resonator 141B and the second power transmission resonator 142B to the opposite phases, and thereby, the strength of the electromagnetic field leaking to the space can be reduced.

Note that the power transmission controller 12 of the power transmission device 1 and the power reception controller 22 of the power receiving device 2 in the embodiments may be configured by combination of an arithmetic device, such as a dedicated integrated circuit, a CPU or an MCU, and a storage device, such as a RAM or a ROM. The arithmetic device can be implemented by, for example, using a general-purpose computer. In other words, functions of the power transmission controller 12 and the power reception controller 22 can be implemented by causing a processor installed onto the above-described computer to execute a program. At this time, the power transmission controller 12 and the power reception controller 22 may be implemented by installing the above program onto the computer in advance, or by storing the program in a storage medium, such as a CD-ROM, or distributing the program via a communication network, to thereby install the program onto the computer. Moreover, a memory that is built in or external to the computer, a hard disk, a storage medium, such as a CD-R, a CD-RW, a DVD-RAM or a DVD-R, or others can be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless power transmission device comprising:
   a plurality of power transmission resonators;
   a communicator configured to receive information related to a power receiving resonator provided in a power receiving device, the information including a number of power receiving resonators, including the power receiving resonator, provided in the power receiving device;
   a power transmission controller configured to select a power transmission resonator to be used in power transmission from the plurality of power transmission resonators based on the number of the power receiving resonators included in the information related to the power receiving resonator; and a power transmission circuit configured to transmit an electric current to the power transmission resonator to be used in the power transmission.

2. The wireless power transmission device according to claim 1, wherein:
the power transmission controller determines to suspend operations of the plurality of power transmission resonators; and
the power transmission circuit does not transmit an electric current or transmits an electric current smaller than an electric current flowing before suspension to the power transmission resonator determined to be suspended the operation.

3. The wireless power transmission device according to claim 2, wherein
the power transmission controller performs abnormality determination of the plurality of power transmission resonators, and determines to suspend the operation of a power transmission resonator determined to be abnormal by the abnormality determination.

4. The wireless power transmission device according to claim 1, wherein
the power transmission controller determines to suspend operation of the power receiving resonator; and
the communicator transmits information for recognizing the power receiving resonator determined to be suspended the operation to the power receiving device.

5. The wireless power transmission device according to claim 1, wherein:
the power transmission controller determines at least one of power transmission resonators which are not to be used for the power transmission as a power transmission resonator to be used for canceling a leakage of an electromagnetic field; and
the power transmission circuit transmits an electric current to the power transmission resonator used for canceling the leakage of the electromagnetic field.

6. The wireless power transmission device according to claim 1, wherein
the power transmission circuit controls a current phase difference of a current flowing through a first power transmission resonator used in the power transmission and a current flowing through a second power transmission resonator used in the power transmission.

7. The wireless power transmission device according to claim 1, wherein
the power transmission controller selects the power receiving resonator to be used in the power transmission based on usage history of each of the power receiving resonator.

8. The wireless power transmission device according to claim 7, wherein
the usage history includes at least one of a count of use, a use time, a supply of power and a used current.

9. The wireless power transmission device according to claim 1, wherein
the power transmission controller selects two power transmission resonators having a coil which is different type from that of the power receiving resonator performing the power transmission.

10. The wireless power transmission device according to claim 1, further comprising a movable part capable of adjusting an orientation or a position of at least one of the plurality of power transmission resonators.

11. A wireless power transmission method for causing performed by a computer, the method comprising:

receiving information related to a power receiving resonator provided in a power receiving device, the information includes a number of power receiving resonators, including the power receiving resonator, provided in the power receiving device;
selecting a power transmission resonator to be used in power transmission from a plurality of power transmission resonators based on the number of power receiving resonators included in the information related to the power receiving resonator; and
transmitting an electric current to the power transmission resonator to be used in the power transmission.

12. A non-transitory computer readable medium having a program stored therein which causes a computer when executed by the computer, to perform processes comprising:
receiving information related to a power receiving resonator provided in a power receiving device, the information includes a number of power receiving resonators, including the power receiving resonator, provided in the power receiving device;
selecting a power transmission resonator to be used in power transmission from a plurality of power transmission resonators based on the number of the power receiving resonators included in the information related to the power receiving resonator; and
transmitting an electric current to the power transmission resonator to be used in the power transmission.

13. A wireless power transmission system comprising a wireless power transmission device and a power receiving device, wherein:
the wireless power transmission device includes:
a plurality of power transmission resonators,
a first communicator configured to receive first information related to a power receiving resonator provided in the power receiving device, the information includes a number of power receiving resonators, including the power receiving resonator, provided in the power receiving device,
a power transmission controller configured to select a power transmission resonator to be used in power transmission from the plurality of power transmission resonators based on the number of the power receiving resonators included in the first information, and
a power transmission circuit configured to transmit an electric current to the power transmission resonator to be used in the power transmission; and
the power receiving device includes:
the power receiving resonator,
a second communicator configured to receive second information related to the power transmission resonator to be used in the power transmission or a power receiving resonator to be used in the power transmission,
a power reception controller configured to recognize the power transmission resonator to be used in the power transmission based on the second information, and
a power receiving circuit configured to conduct an electric current from the power receiving resonator to be used in the power transmission.

14. The wireless power transmission system according to claim 13, wherein:
the power reception controller determines a power receiving resonator to be suspended whose operation based on the second information; and the power receiving circuit does not conduct an electric current from the power receiving resonator to be suspended whose operation.

15. A wireless power transmission system comprising a wireless power transmission device and a vehicle including a power receiving device, wherein:
the wireless power transmission device includes:
a plurality of power transmission resonators,
a first communicator configured to receive first information related to a power receiving resonator provided in the power receiving device, the information includes a number of power receiving resonators, including the power receiving resonator, provided in the power receiving device,
a power transmission controller configured to select a power transmission resonator to be used in power transmission from the plurality of power transmission resonators based on the number of the Dower receiving resonators included in the first information, and
a power transmission circuit configured to transmit an electric current to the power transmission resonator to be used in the power transmission;
the power receiving device includes:
the power receiving resonator,
a second communicator configured to receive second information related to the power transmission resonator to be used in the power transmission or a power receiving resonator to be used in the power transmission,
a power reception controller configured to recognize the power receiving resonator to be used in the power transmission based on the second information, and
a power receiving circuit configured to conduct an electric current from the power receiving resonator to be used in the power transmission; and
the plurality of power transmission resonators is mounted at a place positioned directly below the vehicle when the power receiving device of the vehicle is charged.

16. The wireless power transmission device according to claim 1, wherein
when the number of the power receiving resonators is not equal to a number of the plurality of power transmission resonators, the power transmission controller selects at least one power transmission resonator to be used in power transmission so that the number of the power receiving resonators is equal to a number of the at least one power transmission resonator to be used in power transmission.

\* \* \* \* \*

UNITED STATES PATENT AND TRADEMARK OFFICE
CERTIFICATE OF CORRECTION

PATENT NO.        : 10,348,132 B2
APPLICATION NO.   : 15/393896
DATED             : July 9, 2019
INVENTOR(S)       : Kenichirou Ogawa et al.

Page 1 of 1

It is certified that error appears in the above-identified patent and that said Letters Patent is hereby corrected as shown below:

In the Claims

Claim 15, Column 21, Line 19, change "the Dower" to --the power--.

Signed and Sealed this
First Day of October, 2019

Andrei Iancu
*Director of the United States Patent and Trademark Office*